United States Patent [19]

Harvey et al.

[11] Patent Number: 4,963,428

[45] Date of Patent: Oct. 16, 1990

[54] BIAXIALLY ORIENTED ORDERED POLYMER FILMS

[75] Inventors: Andrew C. Harvey, Waltham; Richard W. Lusignea, Brighton; James L. Racich, Framingham; Dirk M. Baars, Brighton, all of Mass.; Donald D. Bretches, Waynesboro, Va.; Robert B. Davis, Framingham, Mass.

[73] Assignees: Foster Miller, Inc., Waltham; Albany International Research Company, Inc., Mansfield, both of Mass.

[21] Appl. No.: 206,137

[22] Filed: Jun. 13, 1988

Related U.S. Application Data

[63] Continuation-in-part of Ser. No. 98,710, Sep. 21, 1987, which is a continuation of Ser. No. 780,648, Sep. 26, 1985, abandoned.

[51] Int. Cl.$^5$ .............................................. B32B 9/00
[52] U.S. Cl. ................................. 428/220; 428/394; 428/409; 252/299.1; 524/417; 528/193; 528/313; 156/244.14; 264/85; 264/95; 264/177.67; 264/210.7
[58] Field of Search ................... 264/85, 95, 564; 156/244.14; 428/394, 409, 220; 528/193, 313; 524/417; 252/299.1

[56] References Cited

U.S. PATENT DOCUMENTS

| | | |
|---|---|---|
| 3,279,501 | 10/1966 | Donald . |
| 3,404,203 | 10/1968 | Donald . |
| 3,595,736 | 7/1971 | Buteux ................... 428/426 |
| 3,598,637 | 8/1971 | Stoll et al. ............. 428/209 |
| 3,681,297 | 8/1972 | D'Allelio ............... 528/193 |
| 4,011,128 | 3/1977 | Suzuki ................... 264/95 |
| 4,039,610 | 8/1977 | Johnson et al. ......... 264/237 |
| 4,041,206 | 8/1977 | Tsunashima et al. .... 428/409 |
| 4,051,108 | 9/1977 | Helminiak et al. ...... 428/426 |
| 4,085,175 | 4/1978 | Keuchel .................. 264/51 |
| 4,332,759 | 6/1982 | Ide .......................... 264/108 |
| 4,333,907 | 6/1982 | Urasaki et al. ......... 264/290.2 |
| 4,353,954 | 10/1982 | Yamaoka et al. ....... 428/216 |
| 4,358,330 | 11/1982 | Aronovici .............. 156/244.14 |
| 4,370,293 | 1/1983 | Peterson-Hoj ......... 264/514 |
| 4,377,546 | 3/1983 | Helminiak et al. ..... 264/232 |
| 4,384,016 | 5/1983 | Ide et al. ................ 428/291 |
| 4,487,735 | 12/1984 | Chenevey et al. ...... 264/85 |
| 4,496,413 | 1/1985 | Sharps, Jr. . |
| 4,533,692 | 8/1985 | Wolfe et al. ............ 524/417 |
| 4,533,693 | 8/1985 | Wolfe et al. ............ 524/417 |
| 4,533,724 | 8/1985 | Wolfe et al. ............ 528/313 |
| 4,536,365 | 8/1985 | Zwick .................... 264/182 |
| 4,547,416 | 10/1985 | Reed et al. ............. 215/1 C |
| 4,554,119 | 11/1985 | Chenevey ............... 264/85 |
| 4,600,765 | 7/1986 | Lee et al. ............... 528/193 |
| 4,614,629 | 9/1986 | Economy et al. . |
| 4,624,872 | 11/1986 | Stuetz .................... 428/291 |
| 4,659,408 | 4/1987 | Reddins ................. 156/244.17 |
| 4,668,760 | 5/1987 | Boudreaux, Jr. et al. ...... 528/193 |
| 4,699,821 | 10/1987 | Hallock .................. 428/192 |
| 4,721,637 | 1/1988 | Suzuki et al. .......... 428/394 |
| 4,772,089 | 9/1988 | Ide et al. ................ 350/96.23 |
| 4,774,632 | 9/1988 | Neugebauer ........... 361/386 |
| 4,778,244 | 10/1988 | Ryan ...................... 350/96.23 |
| 4,786,348 | 11/1988 | Luise ..................... 428/296 |

FOREIGN PATENT DOCUMENTS

| | | |
|---|---|---|
| 946371 | 6/1962 | European Pat. Off. . |
| 1016363 | 2/1976 | Japan . |
| 6079130 | 2/1976 | Japan . |
| 51-26042 | 3/1976 | Japan . |
| 51-121262 | 10/1976 | Japan . |
| 52-2577 | 1/1977 | Japan . |
| 54-78008 | 6/1979 | Japan . |
| 62-6905 | 1/1987 | Japan . |

OTHER PUBLICATIONS

Kevlar Epoxy Substrate SAMPE Journal Jan. Feb. 84, Packard, pp. 6–14.
Tailaorable CTE Multilayer PWB Radini Jr. 4–15–86.
Tailorable CTE Multilayer PWB Zakrmysek 8–85.
Tailorable CTE Multilayer, PWB Pillar 4–15–86.
Tailarable CTE Multilayer PWB Belle Jr. 3/86.
Journal Thermal Analysin, vol. 8 (1975) 547–555 Porter et al.
PCB Loading, Dance, Electronic Production, Jun, 1982, pp. 42–48.
Thermal Analysis of Chip Carrier Compatible Substrates Amick et al. pp. 34–39.
Advanced Substrates for PCBs, Ginles, pp. 77–80 SAMPE Journal Feb. 1985.
Presentation by Charles E. McChesney of Hoechst Celanese, on Jun. 5, 1988.
Farell and Fellers, *Journal of Polymer Engineering*, vol. 6, Nos. 1–4, 1986.
G. Farell, M. S., Thesis, University of Tennessee, 1984.
Aoki et al., *Polymer Engineering and Science*, Feb. 1980, vol. 20, No. 3.
James L. White, *Plastics World*, p. 42, 1982.
Bodaghi et al., *Polymer Engineering and Sciences*, Mar. 1984, vol. 24.
Lawrence K. English, *ME*, Mar. 1986.
A. Stuart Wood, *Modern Plastics*, Nov. 1987.

*Primary Examiner*—Patrick Ryan
*Attorney, Agent, or Firm*—David G. Conlin; Ernest V. Linek; Linda M. Buckley

[57] ABSTRACT

This invention relates in general to the formation of multiaxially (e.g., biaxially) oriented films from high molecular weight lyotropic or thermotropic polymers (homopolymers, copolymers, and the like), wherein due to the processing conditions employed, the films have a controlled molecular orientation. The films of the present invention are preferably prepared from rod-like extended-chain, aromatic- heterocyclic polymers. These polymers generally fall into two classes; first, those that are modified in solution form, i.e., lyotropic liquid crystalline polymers; and second, those that are modified by temperature changes, i.e., thermotropic liquid crystalline polymers. For a shorthand expression covering both types of polymers, the present disclosure will use the term "ordered polymers."

40 Claims, No Drawings

BIAXIALLY ORIENTED ORDERED POLYMER FILMS

STATEMENT OF GOVERNMENT INTEREST

Funding for the present invention was obtained from the Government of the United States by virtue of Contract Nos. F33615-83-C-5120 and N00164-87-C-0050, from the Departments of the Air Force and the Navy, respectively. Thus, the Government of the United States has certain rights in and to the invention claimed herein.

CROSS REFERENCE TO RELATED APPLICATIONS

This application is a continuation-in-part of copending application Ser. No. 098,710, filed Sept. 21, 1987, which in turn is a continuation of Ser. No. 780,648, filed Sept. 26, 1985, now abandoned. The contents of both of these applications, to the extent necessary, are hereby incorporated herein by reference.

FIELD OF THE INVENTION

This invention relates in general to the formation of multiaxially (e.g., biaxially) oriented films from high molecular weight lyotropic or thermotropic polymers (homopolymers, copolymers, and the like), wherein due to the processing conditions employed, the films have a controlled molecular orientation.

The films of the present invention are preferably prepared from rod-like extended-chain, aromatic-heterocyclic polymers These polymers generally fall into two classes, those that are modified in solution form, i.e., lyotropic liquid crystalline polymers, and those that are modified by temperature changes, i.e., thermotropic liquid crystalline polymers. For a shorthand expression covering both types of polymers, the present disclosure will use the term "ordered polymers."

BACKGROUND OF THE INVENTION

As used herein, "ordered polymers" "extended-chain aromatic-heterocyclic ordered polymers," "thermotropic," and "lyotropic" liquid crystalline polymers, all refer to one or more of the known classes of polymers having a fixed molecular orientation in space i.e., linear, circular, star shaped, or the like.

This molecular orientation is believed to be imposed on the polymer structure by the nature of the monomer units making up the polymer. Many ordered polymers possess a linear "order" due to the linear nature of the monomeric repeating units comprising the polymeric chain. Linear ordered polymers are also known as "rod-like" polymers.

For example, U.S. Pat. No. 4,423,202 to Choe, discloses a process for the production of para-ordered, aromatic heterocyclic polymers having an average molecular weight in the range of from about 10,000 to 30,000.

U.S. Pat. No. 4,377,546 to Helminiak, discloses a process for the preparation of composite films prepared from para-ordered, rod-like, aromatic, heterocyclic polymers embedded in an amorphous heterocyclic system.

U.S. Pat. Nos. 4,323,493 and 4,321,357 to Keske et al., disclose melt prepared, ordered, linear, crystalline injection moldable polymers containing aliphatic, cycloaliphatic and araliphatic moieties.

U.S. Pat. No. 4,229,566 to Evers et al., describes para-ordered aromatic heterocyclic polymers characterized by the presence of diphenoxybenzene "swivel" sections in the polymer chain.

U.S. Pat. No. 4,207,407 to Helminiak et al. discloses composite films prepared from a para-ordered, rod-like aromatic heterocyclic polymer admixed with a flexible, coil-like amorphous heterocyclic polymer.

U.S. Pat. No. 4,108,835 to Arnold et al., describes para-ordered aromatic heterocyclic polymers containing pendant phenyl groups along the polymer chain backbone.

U.S. Pat. No. 4,051,108 to Helminiak et al., discloses a process for the preparation of films and coatings from para-ordered aromatic heterocyclic polymers.

Ordered polymer solutions in polyphosphoric acids (including PBzT compositions) useful as a dope in the production of polymeric fibers and films are described in U.S. Pat. Nos. 4,533,692, 4,533,693 and 4,533,724 (to Wolfe et al.).

The disclosures of each of the above described patents are incorporated herein by reference.

Film processing methods and apparatus have been available for a number of years. However, it is not believed that the methods previously utilized for standard polymeric films, can readily be employed in the formation of lyotropic or thermotropic polymer films, especially films having the unique characteristics of those prepared herein.

For example, U.S. Pat. No. 4,370,293 to Petersen-Hoj describes a method and apparatus for the manufacture of biaxially oriented plastic films, particularly polyester films. The process described for polyester comprises extruding polyester through an annular die to form a seamless tube and inflating the tube by means of a pressurized gas. The expanded tube thus formed is drawn out in a longitudinal direction, cooled and flattened. The flattened tube is heated to the orientation temperature of the film, expanded again, and stretched in its longitudinal direction. These stretching techniques are said to impart a biaxial orientation to the polymeric backbone of the film.

Similarly, U.S. Pat. No. 4,011,128 to Suzuki describes a method and apparatus for forming a cross-oriented film, wherein a non-oriented film to be treated is first formed by conventional methods, then cross-oriented by stretching and twisting. In addition the cross-oriented film is flattened so as to continuously form a laminated cross-oriented film.

U.S. Pat. No. 4,358,330 to Aronovici describes a method and apparatus for manufacturing films having pairs of adjacent layers whose molecular orientation is in different directions. The method employed is a modification of the conventional "blown film" technique such that the molecular chains forming the layers of film are oriented substantially immediately prior to their solidifying.

U.S. Pat. No. 4,496,413 to Sharps, Jr., describes a process and apparatus for the preparation of a blocked cross-plied polymer film which involves the extrusion of a polymer melt through a tubular rotary die. The rotation of a single member of the die is said to impart a molecular orientation to the polymer in a transverse direction during the extrusion. The film is blocked by expanding the film and then pressing opposing walls together to produce a composite film having at least two layers, each having a transverse molecular orientation opposing the other. The composite film is said to have a balanced cross-ply.

The disclosures of each of the above described patents are incorporated herein by reference.

SUMMARY OF THE INVENTION

The present invention is directed to the production of films having heretofore unavailable strength characteristics in more than one direction, i.e., films having a multiaxial orientation, and preferably a high degree of biaxial orientation.

In some preferred embodiments of the present invention, thick films, i.e., films having a thickness greater than or equal to about 0.10 mm, preferably greater than or equal to about 0.20 mm, are formed and used. In other preferred embodiments, thin films, i.e., films having a thickness of less than or equal to about 0.10 mm, preferably less than or equal to about 0.05 mm, are formed.

The starting materials useful herein include those lyotropic or thermotropic polymeric materials in which strain produces a material orientation in the microscale structure and which are relatively weak if this orientation is in only one direction, i.e., uniaxial.

The method of the present invention comprises producing an initial microscale structural orientation within a polymer by a sequence of straining methods, followed by solidifying this orientation by a sequence of thermal and/or chemical conditioning operations.

The films of the present invention have a controllable coefficient of thermal expansion (CTE), low dielectric constant, low moisture pickup characteristics, low outgassing, high tensile strength, high modulus, and superior environmental resistance characteristics in comparison to uniaxial films of similar composition. The films of the present invention also exhibit excellent thermal stability, chemical resistance and toughness, even at low temperatures.

The present invention is also directed to methods and apparatus suitable for producing multiaxially oriented films, coatings, and like materials from thermotropic and lyotropic liquid crystalline polymers

DETAILED DESCRIPTION OF THE PREFERRED EMBODIMENTS

The present invention is especially directed to multiaxially, preferably, biaxially, oriented films, coatings, and like materials, formed from linear thermotropic and lyotropic liquid crystalline polymers.

Preferred lyotropic polymers for use in the present invention are poly-(para-phenylenebenzobisthiazole), (PBzT); poly-(para-phenylenebenzobisoxazole), (PBzO); and poly-(para-phenylenebenzobisimidazole), (PBzI).

These compounds have the generic structure.

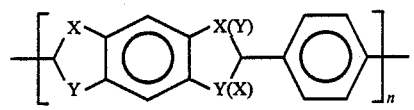

wherein each X is independently selected from the group consisting of sulfur and oxygen; and each Y is nitrogen.

An especially preferred PBzX compound is cis-PBzO, which has the following structure.

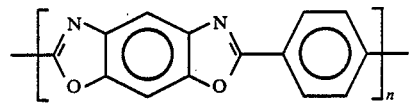

Two especially preferred thermotropic liquid crystalline polymers from which multiaxially oriented films can be prepared are Datrco Manufacturing Company's Xydar and Celanese's Vectra polymers.

The structures of these two polymers are:

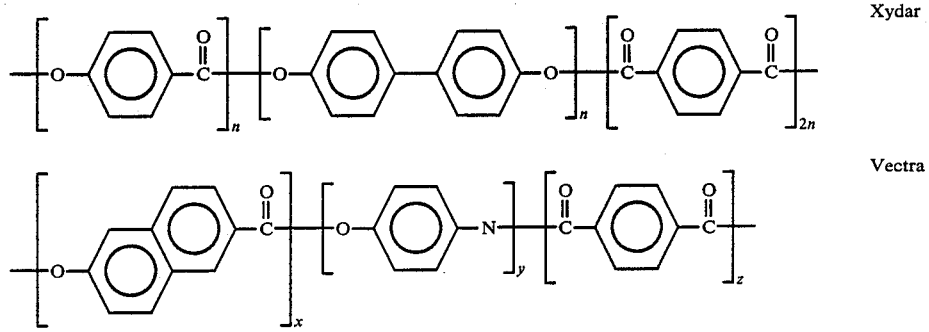

When ordered polymers such as PBzT, PBzI, PBzO, Xydar and/or Vectra are subjected to a shear force they become highly aligned in the direction of the applied force. By imparting to such polymers more than one such force, each in a preferred orientation, one obtains material with an overall high tensile value.

The present invention is thus directed to the production of polymer films that have highly controlled orientation resulting in films that have property balances that are much more useful from a practical standpoint than ordinary uniaxially oriented films.

Films produced according to the present invention have high tensile values (e.g., greater than about 40,000) in the machine direction and substantial strength in the transverse direction (e.g., greater than about 10,000). These films maintain their film integrity in two directions, and as a result are useful in many applications requiring good film properties. For example, the process of the present invention affords films that have strength characteristics making them suitable for the production of laminate film composites and like structures.

The essential strength characteristics of the films of the present invention are the result of a two stage orientation process followed by post treatment to optimize the film property balance.

In preferred embodiments, the biaxial molecular orientation is achieved by utilizing a homogenized dope consisting of cis-PBzO in polyphosphoric acid.

The term "polyphosphoric acid" as used herein, means any of the members of the continuous series of amorphous condensed phosphoric acid/water mixtures, generally given by the formula:

$$H_{n+2}P_nO_{3n+1}$$

wherein the value of n depends upon the molar ratio of water to phosphorous pentoxide present. Such compositions are described in U.S. Pat. Nos. 4,533,692, 4,533,724, and 4,533,693 (to Wolfe et al.).

The first step in processing lyotropic liquid crystalline polymers such as cis-PBzO, comprises a conditioning of the polymer which preferably is about a 10 to 30 weight percent (preferably about 15–20 wt. percent) solution in poly(phosphoric acid), or PPA. PPA is the preferred solvent, although methanesulfonic acid (MSA) or chlorosulfonic acid (CSA) may also be used.

A degassing step may be employed to prevent interference of entrapped gas within the polymer solution with the molecular orientation of the film.

The second step is the orientation step. This may be accomplished by the use of any of the extrusion means which induce shear flow, stretching, and the like. Preferred extrusion means of the present invention include counter rotating tube dies, plates, or roller dies. It has The present inventors have also demonstrated the production of thin films from cis-PBzO with controlled biaxial orientation.

Thin-walled PBzO film-based composites have significant advantages over fiber-reinforced composites. In addition to all of the properties of fiber-based composites including predictable high strength and stiffness, low coefficient of thermal expansion (CTE) and light weight, film-based structures will have advantages of more rapid fabrication, higher volume fractions of reinforcement and internal reinforcement at a very fine scale, without interfaces between fiber and matrix. The lyotropic liquid-crystalline rod-like polymer PBzO is especially attractive because of its high thermal and chemical stability, and its extremely high tensile mechanical properties.

Table I compares machine-direction and transverse-direction thermal expansion properties of PBzO and PBzT films, in three different orientations. Negative CTE is a consequence of rigid-rod molecular alignment in the test direction, while CTE is positive transverse to the direction of orientation.

It is clear from Table I that like PBzT, PBzO can exhibit a variation in molecular alignment sufficient to alter CTE characteristics. Controlled CTE and dimensional stability are critical to optical structures and electronic circuit boards, two areas where PBzT has been applied and which will be of equal importance to PBzO.

TABLE I

| | | | CTE, $\frac{In.}{In. - °C.}$ | |
|---|---|---|---|---|
| POLYMER | I.V. | FILM | MACHINE DIRECTION | TRANSVERSE DIRECTION |
| cis-PBzO | 11 | BALANCED BIAXIAL[1] | −11 | +2 |
| | 11 | HIGHLY DRAWN[2] | −12 | +13 |
| | 11 | HIGHLY DRAWN[3] | −11 | +21 |
| PBzT | 40 | BALANCED BIAXIAL[4] | −7 | +5 |
| | 40 | HIGHLY DRAWN[2] | −14 | +4 |
| | 40 | HIGHLY DRAWN[3] | −15 | +30 |

[1]Biaxial: Maximum strength and stiffness at approximately ±22.5 Deg. to Film machine direction.
[2]Predominantly Uniaxial: Maximum strength and stiffness in the machine direction, but also with high properties within ±20 degrees of machine direction
[3]Nearly Uniaxial: Maximum strength and stiffness in the machine direction, with high properties only within ±5 degrees of machine direction
[4]Balanced Biaxial: Maximum strength and stiffness at approximately ±45 degrees to film machine direction, but with least angular dependence of these properties been discovered that such extrusion means, preferably combined with subsequent stretching of the extrudate, may be employed to impart varying degrees of molecular orientation (i.e., multiaxial orientation) to these polymers.

A third step comprises coagulation of the polymeric solution.

The fourth step is a densification step wherein the PPA is removed.

The penultimate step is generally a drying and heat treatment step.

Finally at the ultimate step, the product film is packaged.

The cis-PBzO films of the present invention exhibit controlled coefficient of thermal expansion (or CTE) behavior. This control has been demonstrated over a range of cis-PBzO films of different multiaxial orientation characteristics.

The cis-PBzO films of the present invention have comparable thermal stability with the previously prepared PBzT films.

Blown dope compositions that have not been subjected to controlled shear fields prior to expansion do not have physical property balances anywhere approaching those of the films of the present invention. Furthermore, films extruded by the counter rotated die but not with the blowing process do not have good property balances. It is the combination of shear field extrusion followed by internal expansion and extension that yields films with a useful property balance.

The extruded, sheared and blown film is quenched, both on the internal and external surfaces, by an aqueous coagulation bath or other controlled aqueous coagulant composition. This quenching operation serves to "gel" the polymer dope composition, producing a strong, tough, solution-filled film.

By controlling the composition of the coagulation bath many other materials can be incorporated into the film microstructure.

In addition to causing the film microstructure to gel and become strong, the aqueous solution serves to hydrolize the polyphosphoric acid to phosphoric acid, facilitating its removal from the film. The solution-filled film is then washed free of phosphoric acid before it is subjected to controlled drying conditions.

The film is preferably dried under controlled internal pressure, also known as a restrained drying process. This is accomplished by drying the film under a regulated air or nitrogen pressure of from about 5 to 10 psi as illustrated. The pressurized film tube in the example may have about 1.5 to 3 inches diameter and a length of from about 5 to 12 inches. Drying under such conditions results in a highly oriented film of high strength characteristics.

When tube-blowing is employed, if the tube is not slit after coagulation but is merely collapsed flat for water-solution and drying treatments, it can then be re-blown and stretched biaxially in a tower- or tunnel-oven. The tube is slit into tape and roll-packaged just downstream of a central plug mandrel and guide rolls. Tube-blowing gas is advantageously introduced through the mandrel.

Transverse shear, longitudinal flow shear, axial stretch, and radial expansion forces all interact in the dies to impart a partial biaxial orientation to the ordered polymer fed therethrough. Variation of the speed of the movement of the shaft and cylinder of the illustrated die, as well as flow rate, temperature, etc. effect the degree of orientation imparted to the ordered polymer feedstock. Additional orientation is imparted to the extruded film by virtue of the blowing processes, both following the extrusion and as a part of the heat treatment.

In the preparation of twisted nematic orientation with cis-PBzO by solution processing, molecules in adjacent planes with twisted orientation are not be able to pack closely on solvent removal. Thus, each "layer" will have to densify by diffusion transverse to the rod axis, an unlikely process on the microscopic scale of the sheet. Consequently, if twisted nematic orientation is smooth and gradual through the film thickness, the densification can occur with the least amount of strain or disruption between adjacent layers Biaxial shearing as well as biaxial direct stresses and strains can be imposed and controlled in this system. A useful combination of strain patterns is achieved by an apparatus where first a twisted nematic (cholesteric) orientation is promoted in the dies and then a uniform biaxial strain is promoted in the blow/stretch. The former provides enough bi-directional strength for the latter, as well as near-order of layers, conducive to densification in the normal (thickness) direction. The biaxial strain can be symmetric or asymmetric. If this system is operated with low strain in the dies, then biaxial blow/stretch will promote biaxial nematic orientation rather than twisted nematic.

Of course, the system of the present invention could be used to produce uniaxial nematic tube or film as well.

A common characteristic of laminates of the preferred biaxial film materials is that they can be weak in the normal direction (i.e., perpendicular to the plane of the laminated film). It is therefore desirable to increase the so called trans-laminar strength of biaxial films by using additional processing steps in the manufacture of the films.

These additional steps can be during the preparation of the dope or in the washing or solution processing of the coagulated film. Trans-laminar strength of the film can be increased either by increasing the cohesively between the ordered, rigid-rod polymer structure, and/or by enclosing the ordered structure in a binding, surrounding network of the added material. This added material typical does not interfere with the rest of the processing steps, because the added material is not rendered strong and cohesive except by a subsequent processing step, e.g., heat treating or chemical conversion.

An important aspect of the methods envisioned for increasing trans-laminar film strength is that the added material is not necessarily intended to be a major fraction of the final structural material or film; the added material can be a very minor constituent of the final structure and still provide substantial trans-laminar cohesivity or strength. In fact, since the rigid-rod ordered polymeric structure is relatively very competent, the added material most preferably is a very minor component, such that the final overall material has the highest specific strength and stiffness properties, i.e., highest strength and stiffness per weight and volume.

One method of increasing the trans-laminar strength of biaxial cis-PBzO film is to blend a finely divided powder of compatible material with the PBzO dope during the dope-preparation step of the total process. A preferred material is polyphenylene sulfide (PPS), at about 10 percent by volume (or more) of the final dope. PPS is a strong, highly resistant, thermotropic polymer. This powder remains in the dope and the prepared film through all of the processing steps up to the final drying stage. During drying and heat treating, the film is heated to a temperature that melts the PPS, causing it to flow around and between the PBzO rod-like microscale structure. Subsequent pressing or rolling and cooling produces a structure that is strong in all directions of stress.

Another method of increasing trans-laminar strength is to diffuse a precursor of a strong binder material into the PBzO film during the washing stage of the process. This precursor can be an organometallic precursor of an inorganic glass, such as tetramethoxysilane; or an organically-modified glass precursor that has reactive organic groups incorporated therein, such as expoxides; or a precursor of a thermotropic plastic, such as caprolactam as a precursor for nylon, or polyamic acid as a precursor for polyimide.

After the precursor has diffused into the washed but still swollen PBzO film, e.g., via various sequential solvent exchanges, the film is dried and heat treated, causing a transformation of the added material to its final form as a strong trans-laminar binder material. As a final binder material, glasses and polyimides are preferred over nylons, because the former materials more nearly complement the high temperature and strength properties of the PBzT film structure.

The processing equipment of the present invention is straight forward in design and fabrication, with the exception of the counter-rotating die assembly. The storage tank must be heated, is preferably made of stainless steel (e.g., type 316L suitable for PPA processes), and is pressurized with dry/inert gas (e.g., $N_2$) in order to prevent both coagulation of the dope and/or starvation of the pump. The pump is typically a precision-gear type (e.g., Zenith). Other types of pump, such as piston-ram, extruder, or traveling-cavity (Moyno), are possible While other counter-rotating tube-dies exist, the design of the die of the present invention is specialized in that a wide range of parameters can be explored by using different speeds and die-inserts. Sealing between the hot block and die cylinders is affected by spring loaded face-bushing (Teflon ® or graphite), and alignment is maintained by remote collar bearings. Because the extrudate undergoes so much densification to final thickness, the die annulus is usually large, moderating die pressure required. The central gas for film blowing ($N_2$) is provided through a remote, cooler, standard rotating coupling.

Function and operation of the extrusion-blowing system are thus straightforward:

Counter-rotation of the dies generates transverse shear without any net twist or torque on the extruded tube.

The pump generates the axial flow and, in combination with the annular gap, determines the axial shear (flow profile).

Draw-down of the tube at a linear rate greater than die-discharge causes an axial strain in the hot, uncoagulated extrudate.

Blowing of the film tube causes circumferential stress and strain in the extrudate.

Immersion in a water bath after blow/stretch causes coagulation and, below the central water level, a balance of pressure and nulling of pressure differential, unless the tube is pinched closed at the bottom.

The applications thus far identified for lyotropic liquid crystalline polymer films are numerous, including structural, aerospace, electronic, optical, ballistic-protection and communications applications. The speed and ease of development in many of these areas will be enhanced when large quantities of low cost films, having properties and behavior quite like those of PBzT, became readily available.

In addition to processing PBzX type polymers (e.g., PBzT, PBzO, etc.) the processing conditions of the present invention have been extended to thermotropic liquid crystalline polymers, especially Xydar and Vectra.

Xydar is the tradename of Dartco's high temperature thermotropic resin. Vectra is Celanese's trademark for their range of plastic resins exhibiting performance characteristics similar to those of Xydar.

Xydar has the highest temperature resistance of all commercially available liquid crystalline polymers Because Xydar is a thermotropic polymer, the film can be molded at high temperature. This allows Xydar to be employed in a vast array of applications not available to the lyotropic polymers, e.g., in the automotive industry for sheet molded parts.

Xydar resin melts at about 800° F., and is the highest strength unfilled thermotropic liquid crystalline polymer (LCP) commercially available. The melt characteristics of this resin are generally tailored for injection molding, i.e., low pressure and easy flow when pumped through narrow cavities (high shear conditions). There was some speculation that this material could not be extruded at all.

For use with Xydar, the present inventors modified the pump block, extrusion die, and the exit end of the extruder. These changes included modifying the pump block and extruder end reflect the need to sustain high shear, minimize pressure drops, and avoid dead spots in the melt flow path. This was achieved through use of a conventional injection-molding type screw end and coupling on the extruder, and through incorporation of a split pump block which facilitated machining of the curved flow passages.

A summary of the die construction changes is provided in Table II.

TABLE II

| DIE CONSTRUCTION MODIFICATIONS | | |
|---|---|---|
| Feature | PBzT/PBzO Die | Xydar Die |
| Operating temperature | 250° F. | 800° F. |
| Feed holes | 12 × ⅛ in. | 48 × 1/16 in. |
| Extruded tube diameter | 1⅛ in. | 1¼ in. |
| Temperature control zones | 1 | 3 |
| Shear zone gap | 0.080 in. | 0.080 in. |
| length | 2 in. | 4 in. |
| Exit gap | 0.080 in. | 0.030 in. |
| Full flow pressure drop | 1,000 psi | 4,000 psi |

In order to obtain better control of the tubular extrusion process of Xydar and Vectra, an air ring system, converging rack, and nip roll unit were assembled downstream of the extrusion die.

This equipment allows more precise draw and orientation control for the blown film. The air ring permits controlled rapid cooling of the hot film, while the nip unit allows controlled extensional draw and positive bubble closure, and the converging rack minimizes potential wrinkling of the flattened bubble during nipping.

The redesigned die also incorporated three separate temperature control zones. The center zone, where the polymer melt is introduced, was designed to operate at high temperatures (750° to 850° F.). The exit zone has the capability of control at lower temperatures, so as to effect greater orientation through rotational and longitudinal shear. Finally, the upper end of the die, which contains the alignment bearings, operates below 250° F., so as to maintain proper functioning of the bearings. Other features of the die, and comparison with the PBzT counter-rotational die, are reviewed in Table III.

TABLE III

| PBzT/PBzO v. XYDAR DIE CONSTRUCTION | | |
|---|---|---|
| Feature | PBzT Die | Xydar Die |
| Bore diameter | ¾ in. | 1 in. |
| Able to handle standard ⅛ in. pellet feed | No | Yes |
| L/D | 20 | 24 |
| Barrel | Xaloy plated steel | Xaloy plated steel |
| Screw | Hastelloy C | Chrome plated steel |
| Maximum barrel pressure | 10,000 psi | 10,000 psi |
| Maximum resin throughput | 30 cc/min | 60 cc/min |
| Maximum operating temperature | 600° F. | ≧ 800° F. |
| Metering pump maximum operating temperature | 950° F. | 950° F. |
| Material | M2 tool steel | D2 tool steel |
| cc/rev | 0.3 | 0.6 |

Equipment was fabricated to supply the starved-feed condition recommended by Dartco for the SRT-300 resin A simple auger feed apparatus was assembled.

Resin was fed into the preheated empty extruder and die, and film was extruded. Operating conditions are summarized in Table IV.

The resin was fed manually into the entry port simulating starved feed conditions. Preliminary calculations predicted that high melt pressures would be experienced in the die. To minimize these pressures the die temperature controller was set initially to 800° F., with the intention of reducing this temperature after extrusion reached steady state. This scheme would reduce the possibilities of pressure surges and equipment damage.

TABLE IV
OPERATING CONDITIONS OF XYDAR EXTRUSION

| Temperature | |
|---|---|
| Barrel | 800° F. |
| Melt | 742° F. |
| Die Zone 1 | $\geq$160° F. |
| 2 | 800° F. |
| 3 | 800° F. |
| Resin throughput | 7.7 cc/min |
| Draw (estimated) | 5 max |
| blowout | 2 max |
| Counter-rotational mandrel rpm | 2.4 |
| Counter-rotational shear | 4.72 sec$^{-1}$ |
| Film Made | |
| Free fall from die: | 1⅛ in. diameter |
| | 15 mil thick |
| Maximum blow and draw: | 2¼ in. diameter |
| | 5½ mil thick |

The extruded Xydar film was golden in color (similar to that of the resin pellets), quite heavily textured on its outside surface, and much less so on the inside. The heavy texture appeared to relate to voids, especially notable in the thinnest, most highly blown areas of the tubes. While Xydar resin neither absorbs moisture readily, nor retains much moisture at equilibrium, the possibility exists that the film texture relates to moisture loss. Pre-drying of resin in a heated vacuum oven should help resolve the problem.

The voids in the film give it a nonhomogeneous appearance and result in rough surface texture. When held up to the light, the Xydar film looks like a connected network with the characteristic "fibrils" at roughly balanced angles to the machine direction.

The "mottled" nature of the Xydar film could be due to evolution of gas bubbles from moisture entrained in the Xydar. Even a small percentage of moisture can cause foaming, as in nylon extrusion. Pre-drying of the Xydar resin should check this moisture effect.

It is also likely that the Xydar melt did not flow evenly during extrusion, resulting in regions of high and low consolidation. This problem could be solved by using the "extrusion grade" material which should have better draw characteristics. Also, changes in temperature, pressure and throughput will improve properties and surface finish.

Fifteen pounds of Vectra B900 resin was procured from Celanese, dried per manufacturer's recommendations, and successfully extruded into a film with a variety of biaxial orientations. Table V reviews the conditions and results from extrusion.

The Vectra films exhibited much less porosity than the Xydar films, showed biaxial fibrillation and strength at the time of extrusion, and possessed an extremely smooth surface. Film thicknesses from 2 to 10 mils were readily obtained with some tubes as thick as 17 mils.

As was done with Xydar film, thermally bonded laminates were obtained, both with the uniaxial Celanese Vectra film and with the freshly prepared biaxial Vectra films. Because of the differences between the two grades of resin (the Celanese film uses A900 Vectra, while the films of the present invention used B900), temperatures and pressures were optimized for each laminate type. Copper cladding was successfully accomplished with the biaxial film as well.

TABLE V
VECTRA EXTRUSION CONDITIONS and RESULTING FILM

A. Extrusion Conditions

| | |
|---|---|
| Melt temperature | 600 to 650° F. |
| Melt pressure | 2,000 to 2,500 psi |
| Die shear | 3 to 9 sec$^{-1}$ |
| Draw | 1 to 3 |
| Die annulus thicknesses | 1.25 in. diameter × 0.0125 in. |
| Blowout | 1 to 2 |

B. Resulting Film

| Type of Orientation | Film Thickness | Ft of Film |
|---|---|---|
| ±20° to ±25° Predominantly Uniaxial | 2 to 7 mils | 10 |
| ±25° to ±35° Nearly Balanced Biaxial | 2 to 3 mils | 20 |
| ±10° Nearly Uniaxial | 2 to 3 mils | 10 |

Table VI represents preliminary data for the above identified Vectra film samples:

TABLE VI
PRELIMINARY CHACTERISTICS OF VECTRA FILMS

| Sample Orientation to MD | No. of Samples Tested | Tensile Strength, ksi | Tensile Mod., msi | CTE ppm/°C. |
|---|---|---|---|---|
| 0° | 5 | 103 | 2.66 | — |
| 0° | 2 | — | — | −14.4 |
| 90° | 2 | <10 | — | +31.9 |

The high tensile properties indicate that Vectra indeed offers desirable properties for PWB applications. However, the highly anisotropic CTE properties of the unidirectional film must be modified if isotropic x and y CTE in the 3.7 ppm/°C. range is to be achieved. This desired CTE characteristic can be tailored into the film by inducing biaxial orientation of the molecules in the film as is done with PBzT.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A film having a controllable coefficient of thermal expansion, selected from negative, positive, or zero in any plane of the film and a thickness of at least about 0.10 mm, prepared from a molecularly ordered lyotropic liquid crystalline polymer, said film having a multiaxial molecular orientation.

2. The film of claim 1, wherein the thickness is at least about 0.20 mm.

3. The film of claim 2, wherein the multiaxial molecular orientation is nearly balanced biaxial.

4. The film of claim 2, or 3, wherein the lyotropic liquid crystalline polymer is poly-(-phenylene benzobisoxazole.

5. A film having a controllable coefficient of thermal expansion, selected from negative, positive, or zero in any plane of the film and a thickness of less than about 0.10 mm, prepared from a molecularly ordered lyotropic liquid crystalline polymer, said film having a multiaxial molecular orientation.

6. The film of claim 5, wherein the multiaxial molecular orientation is nearly balanced biaxial.

7. The film of claim 6 or 7, wherein the lyotropic liquid crystalline polymer is poly-(-phenylene benzobisoxazole.

8. A film having a controllable coefficient of thermal expansion, selected from negative, positive, or zero in any plane of the film and a thickness of at least about 0.10 mm, prepared from a molecularly ordered thermotropic liquid crystalline polymer, said film having a multiaxial molecular orientation.

9. The film of claim 8, wherein the thickness is at least about 0.20 mm.

10. The film of claim 9, wherein the multiaxial molecular orientation is nearly balanced biaxial.

11. The film of claim 8, 9, or 10, wherein the thermotropic liquid crystalline polymer has the structure:

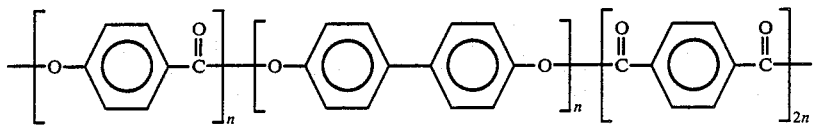

12. A film having a controllable coefficient of thermal expansion, selected from negative, positive, or zero in any plane of the film and a thickness of less than about 0.10 mm, prepared from a molecularly ordered thermotropic liquid crystalline polymer, said film having a multiaxial molecular orientation.

13. The film of claim 12, wherein the multiaxial molecular orientation is nearly balanced biaxial.

14. The film of claim 12 or 13, wherein the thermotropic liquid crystalline polymer has the structure:

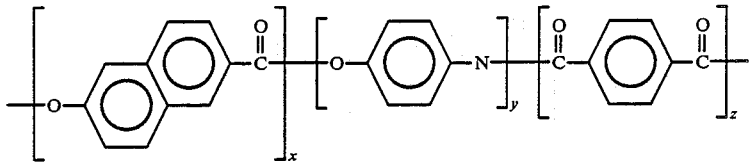

15. A film having a controllable coefficient of thermal expansion, selected from negative, positive, or zero in any plane of the film and a thickness of at least about 0.10 mm, prepared from a molecularly ordered thermotropic liquid crystalline polymer, said film having a multiaxial molecular orientation.

16. The film of claim 15, wherein the thickness is at least about 0.20 mm.

17. The film of claim 16, wherein the multiaxial molecular orientation is nearly balanced biaxial.

18. The film of claim 15, 16, or 17, wherein the thermotropic liquid crystalline polymer has the structure:

19. The film of claim 1, 2 or 3, wherein the ordered lyotropic liquid crystalline polymer is a para-ordered, aromatic heterocyclic polymer, an ordered, linear, crystalline polymer containing aliphatic, cycloaliphatic and aralphatic moieties, a para-ordered aromatic heterocyclic polymer having diphenoxybenzene swivel sections in the polymer chain, a para-ordered aromatic heterocyclic polymer containing phenyl groups along the polymer chain backbone, or p-phenylenebenzo bisthiazole.

20. A method of preparing a multiaxially oriented film from a lyotropic liquid crystalline polymer, the film having a controllable coefficient of thermal expansion, selected from negative, positive, or zero in any direction in the plane of the film, comprising the steps of:
(a) subjecting a dope containing said polymer to at least two cross-directional strain forces; and
(b) solidifying the microscale structural orientation formed in step (a) by physical, chemical or thermal means.

21. The method of claim 20, wherein the multiaxial orientation is nearly balanced biaxial.

22. The method of claim 20 or 21, wherein the lyotropic liquid crystalline polymer is poly-phenylene benzobisoxazole.

23. A method of preparing a multiaxially oriented film from a thermotropic liquid crystalline polymer, the film having a controllable coefficient of thermal expansion, selected from negative, positive or zero in any direction in the plane of the film, the method, comprising the steps of:
(a) subjecting a polymer melt of said polymer to at least two cross-directional strain forces; and
(b) solidifying the microscale structural orientation formed in step (a) by physical, chemical or thermal means.

24. The method of claim 20, wherein the multiaxial orientation is nearly balanced biaxial.

25. The method of claim 23 or 24, wherein the thermotropic polymer has the formula:

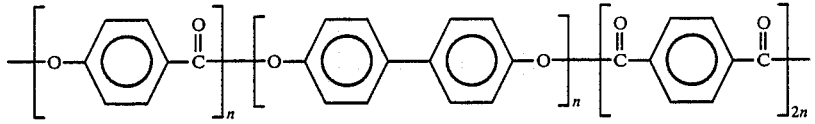

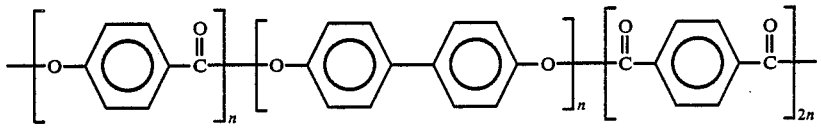

26. The method of claim 23 or 24, wherein the thermotropic polymer has the formula:

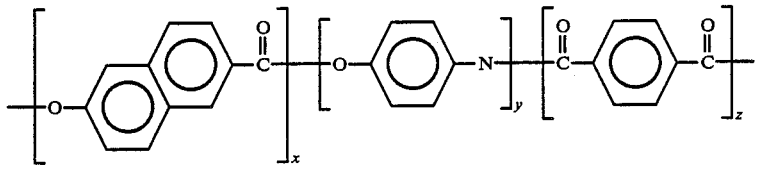

27. The film of claim 1, 2 or 4, wherein the multiaxial molecular orientation is balanced biaxial at about ±45 degrees to film machine direction.

28. The film of claim 5 or 7, wherein the multiaxial molecular orientation is balanced biaxial at about ±45 degrees to film machine direction.

29. The film of claim 8 or 9, wherein the multiaxial molecular orientation is balanced biaxial at about ±45 degrees to film machine direction.

30. The film of claim 12 or 15, wherein the multiaxial molecular orientation is balanced biaxial at about ±45 degrees to film machine direction.

31. The method of claim 20 or 23, wherein the film has a thickness of at least about 0.10 mm.

32. The method of claim 20 or 23, wherein the film has a thickness of at least about 0.20 mm.

33. The method of claim 20 or 23, wherein the film has a thickness of less than 0.10 mm.

34. The method of claim 20, wherein the dope is subjected to a first cross-directional strain force comprising transverse shear field extrusion, and wherein the discharged dope is subjected to second cross-directional strains comprising transverse and longitudinal extensions.

35. The method of claim 33, wherein the first cross-directional strain force comprises transverse shear imparted by counter-rotating members selected from counter-rotating dies, counter-rotating plates, and counter-rotating pinch rolls or belts, as the dope is passed through and discharged from the members.

36. The method of claim 34, wherein the second cross-directional strain force is imparted by simultaneously stretching the discharged dope transversely and drawing down the discharged dope at a linear rate greater than the rate at which the dope is discharged from the counter-rotating member.

37. The method of claim 34, 35 or 36 wherein the shear stress applied to the film during manufacture is sufficient to produce film having an ultimate tensile strength in any direction of at least 40,000 psi.

38. The method of claim 34, 35 or 36 wherein the shear stress applied to the film during manufacture is sufficient to produce films having an ultimate tensile stress of at least 100,000 psi in at least one direction.

39. The method of claim 34, 35 or 36 wherein the shear stress applied to the film during manufacture is sufficient to produce film having a tensile modulus in any direction of at least $8 \times 10^5$ psi.

40. The method of claim 34, 35 or 36, wherein the shear stress applied to the film during manufacture is sufficient to produce film having a tensile modulus of at least $5 \times 10^6$ psi in at least one direction.

* * * * *